(12) United States Patent
Dowling

(10) Patent No.: US 9,739,945 B2
(45) Date of Patent: Aug. 22, 2017

(54) DISTRIBUTED PASSIVE OPTICAL NETWORKS

(71) Applicant: Tyco Electronics Corporation, Berwyn, PA (US)

(72) Inventor: Douglas F. Dowling, Cary, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/491,049

(22) Filed: Sep. 19, 2014

(65) Prior Publication Data

US 2015/0192741 A1   Jul. 9, 2015

Related U.S. Application Data

(63) Continuation of application No. 13/588,045, filed on Aug. 17, 2012, now abandoned.

(60) Provisional application No. 61/524,745, filed on Aug. 17, 2011.

(51) Int. Cl.
| | | |
|---|---|---|
| G02B 6/00 | (2006.01) | |
| G02B 6/26 | (2006.01) | |
| H04Q 11/00 | (2006.01) | |
| G02B 6/38 | (2006.01) | |

(52) U.S. Cl.
CPC ........... *G02B 6/262* (2013.01); *G02B 6/3897* (2013.01); *H04Q 11/0003* (2013.01); *H04Q 11/0067* (2013.01)

(58) Field of Classification Search
USPC .................................................. 385/135, 147
See application file for complete search history.

(56) References Cited

U.S. PATENT DOCUMENTS

| | | |
|---|---|---|
| 6,616,344 B1 | 9/2003 | Van Deventer |
| 7,277,614 B2 | 10/2007 | Cody et al. |
| 7,346,243 B2 | 3/2008 | Cody et al. |
| 7,349,605 B2 | 3/2008 | Noonan et al. |
| 7,409,127 B1 | 8/2008 | Hurley et al. |
| 7,519,258 B2 | 4/2009 | Wilken et al. |
| 8,953,942 B1* | 2/2015 | Lam ................... H04J 14/0282 398/68 |
| 2005/0036749 A1* | 2/2005 | Vogel .................. H04B 10/272 385/100 |

(Continued)

FOREIGN PATENT DOCUMENTS

| | | |
|---|---|---|
| EP | 1 876 736 A1 | 1/2008 |
| WO | WO 2010/010378 A1 | 1/2010 |
| WO | WO 2011/051930 A1 | 5/2011 |

OTHER PUBLICATIONS

International Search Report and Written Opinion for PCT/US2012/051315 mailed Feb. 14, 2013.

(Continued)

*Primary Examiner* — Eric Wong
(74) *Attorney, Agent, or Firm* — Merchant & Gould P.C.

(57) ABSTRACT

A passive optical network includes one or more multi-service terminals each having a housing and a plurality of ruggedized plug-receiving distribution ports accessible from outside the housing. The multi-service terminals also each include an optical power splitter or wave division multiplexer for splitting an optical signal and directing the split signal to the plug-receiving distribution ports. Some of the multi-service terminals provide a different power split ratio from others of the multi-service terminals.

16 Claims, 7 Drawing Sheets

(56) References Cited

U.S. PATENT DOCUMENTS

| | | | |
|---|---|---|---|
| 2006/0008231 A1 | 1/2006 | Reagan et al. | |
| 2006/0153517 A1* | 7/2006 | Reagan | G02B 6/3897 385/135 |
| 2006/0269208 A1* | 11/2006 | Allen | G02B 6/4471 385/135 |
| 2009/0317047 A1 | 12/2009 | Smith et al. | |
| 2010/0086260 A1 | 4/2010 | Parikh et al. | |
| 2010/0092133 A1 | 4/2010 | Conner | |
| 2010/0316390 A1 | 12/2010 | Almog | |
| 2011/0129226 A1 | 6/2011 | Vleugels et al. | |
| 2011/0293277 A1 | 12/2011 | Bradea et al. | |
| 2012/0027355 A1 | 2/2012 | LeBlanc et al. | |
| 2013/0039656 A1* | 2/2013 | Lam | H04J 14/0282 398/47 |
| 2013/0216187 A1* | 8/2013 | Dowling | H04Q 11/0003 385/71 |

OTHER PUBLICATIONS

"Wavelength Division Multiplexing (WDM)." The Fiber Optic Association—Tech Topics, Apr. 27, 2010 (via wayback machine).

* cited by examiner

US 9,739,945 B2

DISTRIBUTED PASSIVE OPTICAL NETWORKS

CROSS REFERENCE TO RELATED APPLICATIONS

This application is a continuation of application Ser. No. 13/588,045, filed Aug. 17, 2012, which application claims the benefit of provisional application Ser. No. 61/524,745, filed Aug. 17, 2011, which applications are incorporated herein by reference in their entirety.

TECHNICAL FIELD

The present disclosure relates generally to equipment for fiber optic communications networks. More particularly, the present disclosure relates to the components of passive optical networks and methods for deploying the same.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

SUMMARY

Certain aspects of the disclosure relate to fiber optic cable systems.

In example systems, a distributed passive optical network includes one or more feeder terminals and one or more distribution terminals. In accordance with some aspects, each terminal includes an optical power splitter arrangement. In accordance with other aspects, one or more terminals include wave division multiplexers.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
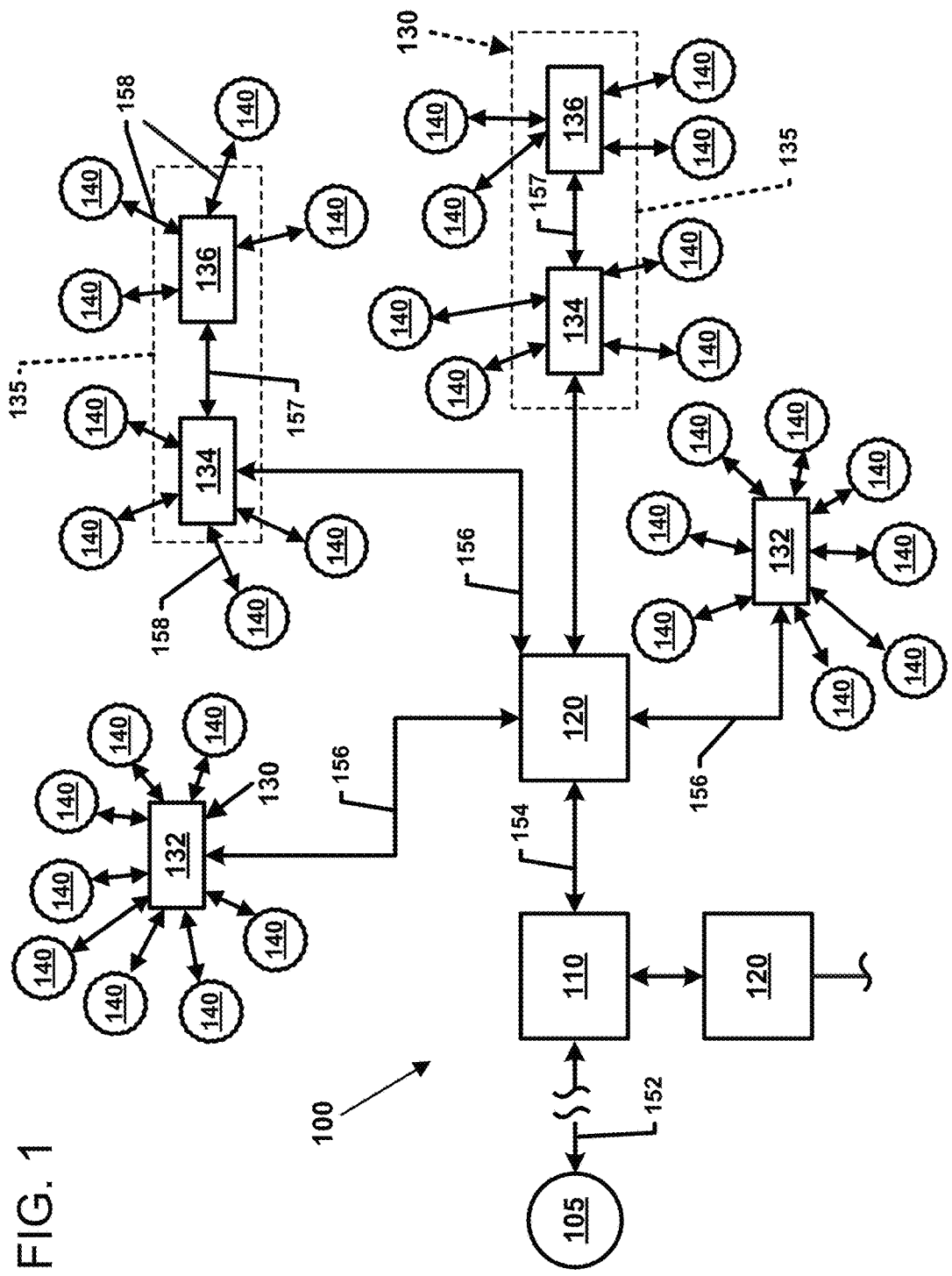
FIG. 1 shows an example distributed passive fiber optic network.

FIG. 1 shows an example network 100 deploying passive fiber optic lines. The example network 100 can include a central office 105 that connects a number of end subscribers 140 (also called end users herein) in a network. The central office 105 can additionally connect to a larger network such as the Internet (not shown) and/or a public switched telephone network (PSTN). The network 100 includes multiple break-out locations at which branch cables are separated out from the main cable lines. Feeder cables 152 may branch off from the main cable lines and connect to fiber distribution hubs (FDHs) or pedestals 110 that include connector interfaces for facilitating coupling of the fibers of the branch cables to multiple different subscriber locations 140. Each FDH or pedestal 110 may accept a feeder cable 152 from the central office or other upstream portion of the network 100. The feeder cable 152 may have one or more fibers. The hub or pedestal 110 may separate and/or split the fibers of the feeder cable 152 into one or more distribution fibers 154.

Each distribution fiber 154 may be routed to a feeder terminal 120. Each feeder terminal 120 includes a splitter arrangement at which the distribution fiber 154 may be split into two or more drop fibers 156. Each drop fiber 156 is routed to a distribution terminal arrangement 130. Each distribution terminal arrangement 130 includes a splitter arrangement at which the respective drop fiber 156 is split into two or more subscriber fibers 158. Some types of the distribution terminal arrangements 130 evenly split the signals received from the drop fibers 156 as will be disclosed in more detail herein. Other types of distribution terminal arrangements 130 split the signal ratios unevenly.

In some implementations, the splitter arrangements include optical power splitting structures. In other implementations, the splitter arrangements include wavelength splitting/dividing structures. Optical power splitters are capable of splitting an entire optical signal carried by one optical fiber to two or more optical fibers (e.g., 1 by 2 splitters; 1 by 4 splitters; 1 by 8 splitters, 1 by 16 splitters; 1 by 32 splitters, etc.), and are also capable of combining optical signals from multiple fibers back to one optical fiber. Wavelength splitting/dividing structures (e.g., coarse wavelength dividing multiplexers and de-multiplexers, dense wavelength dividing multiplexers and de-multiplexers, array waveguide grading structures, etc.) are capable dividing an optical signal carried by one optical fiber into separate wavelength ranges with each range then being directed to and carried by a separate optical fiber, and are also capable of combining separate wavelength ranges carried by separate optical fibers back to one optical fiber.

In the example shown in FIG. 1, the feeder terminal 120 includes a 1 by 4 optical power splitter that splits the distribution fiber 154 into four drop fibers 156. Two of the drop fibers 156 are each routed to a first example type of distribution terminal 132 having 1 by 8 optical power splitters that split the drop fibers 156 into eight subscriber fibers 158. Another two of the drop fibers 156 are each routed to a cascading distribution terminal arrangement 135 that includes an example second type of distribution terminal 134 and an example third type of distribution terminal 136. The second type of distribution terminal 134 includes a splitter arrangement including a 1 by 2 optical splitter and a 1 by 4 optical splitter. A cascade fiber 157 output from the 1 by 2 optical power splitter is routed to the input of the third type of distribution terminal 136, which includes a 1 by 4 optical splitter. Output of each 1 by 4 optical splitter is carried by the respective subscriber fiber 158 to one of the end users 140.

In some implementations, the feeder terminals 120 and/or the distribution terminals 130 may be implemented as multi-service terminals (MSTs). Non-limiting examples of a multi-service terminal housing a splitter arrangement are shown in U.S. Pat. No. 7,444,056 and U.S. Publication No. 2009/0208177, the disclosures of which are hereby incorporated herein by reference. In some implementations, one or more of the feeder terminals 120 and/or distribution terminals 130 may include fiber spools from which a respective fiber may be deployed. One example multi-service terminal housing a fiber spool is shown in U.S. application Ser. No. 12/487,318, filed Jun. 18, 2009, and titled "Methods and Systems for Distributing Fiber Optic Telecommunications Services to Local Area," and U.S. application Ser. No. 13/195,939, filed Aug. 2, 2011, and titled "Cable Spool Assembly," the disclosures of which are hereby incorporated herein by reference.

Figure 2:
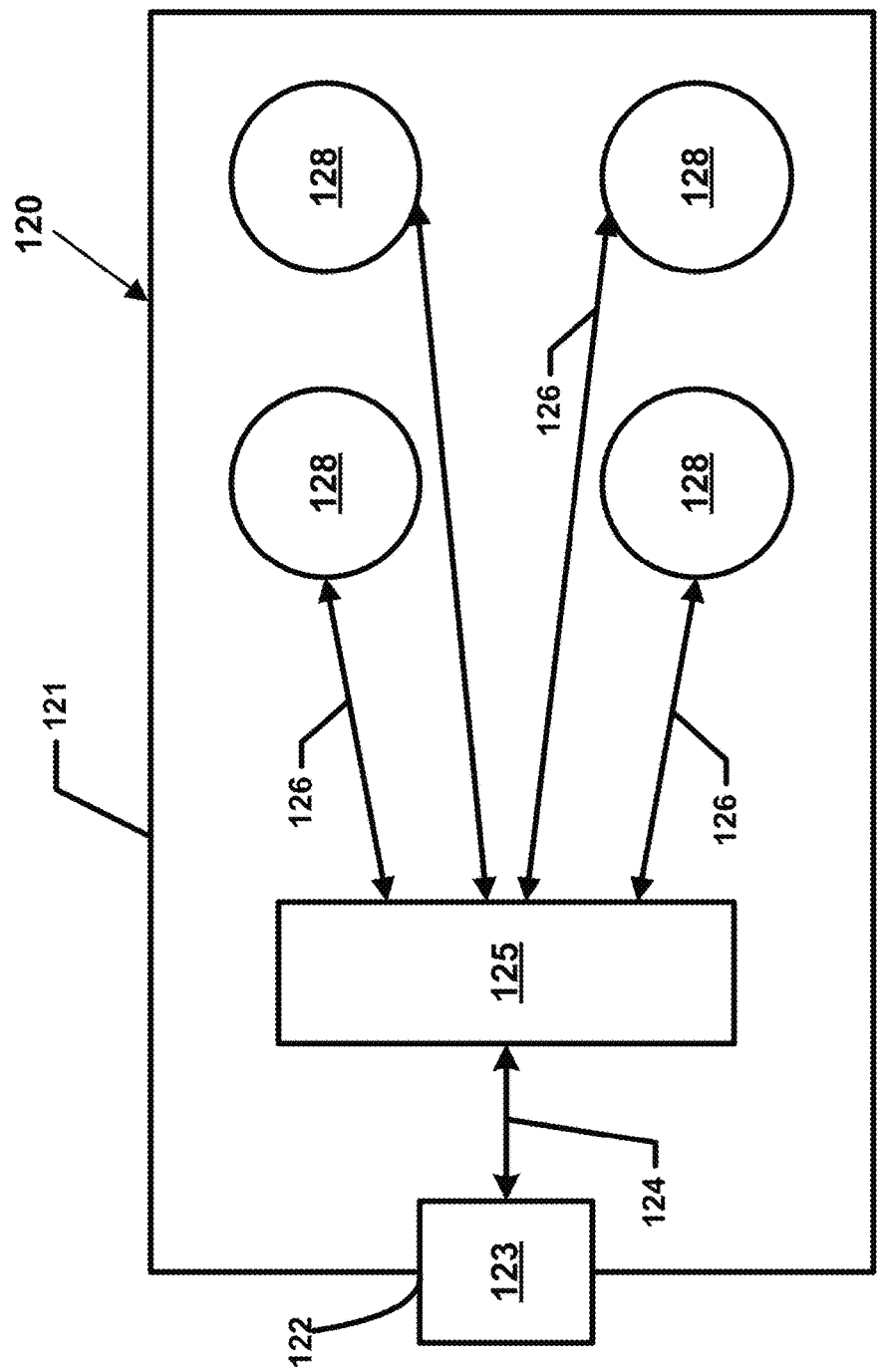
FIG. 2 is a schematic block diagram of one example feeder terminal suitable for use in the passive optical network of FIG. 1.

FIG. 2 is a schematic block diagram of one example feeder terminal 120 suitable for use in the passive optical network 100 of FIG. 1. The feeder terminal 120 includes a body 121 defining an input port 122 and at least two output ports 128. The distribution fiber 154 is received at the input port 122. In the example shown, the feeder terminal body 121 defines four output ports 128. In other implementations, however, the feeder terminal body 121 may define greater or fewer (e.g., three, five, eight, etc.) output ports 128. The feeder terminal body 121 houses a splitter arrangement 125 that is configured to split optical signals carried over the distribution fiber 154 to the output ports 128 (see lines 126). In the example shown, the splitter arrangement 125 includes a 1 by 4 power splitter.

In some implementations, an optical connector interface 123 is disposed at the input port 122 of the feeder terminal body 121 to enable a "plug and play" type connection. In certain implementations, the optical connector interface 123 is ruggedized (i.e., hardened) to seal the interior of the feeder terminal body 121 from contaminants. In some implementations, the optical connector interface 123 includes an optical connector from which a splitter input fiber 124 routes to the splitter arrangement 125. In other implementations, the optical connector interface 123 includes an optical socket from which a splitter input fiber 124 routes to the splitter arrangement 125. In still other implementations, the optical connector interface 123 includes an optical adapter configured to interface two optical connectors. Some non-limiting example ruggedized optical connector interfaces suitable for use with a feeder terminal 120 are disclosed in U.S. Pat. Nos. 7,744,288, 7,762,726, 7,744,286, 7,942,590, and 7,959,361, the disclosures of which are hereby incorporated herein by reference.

Figure 3:
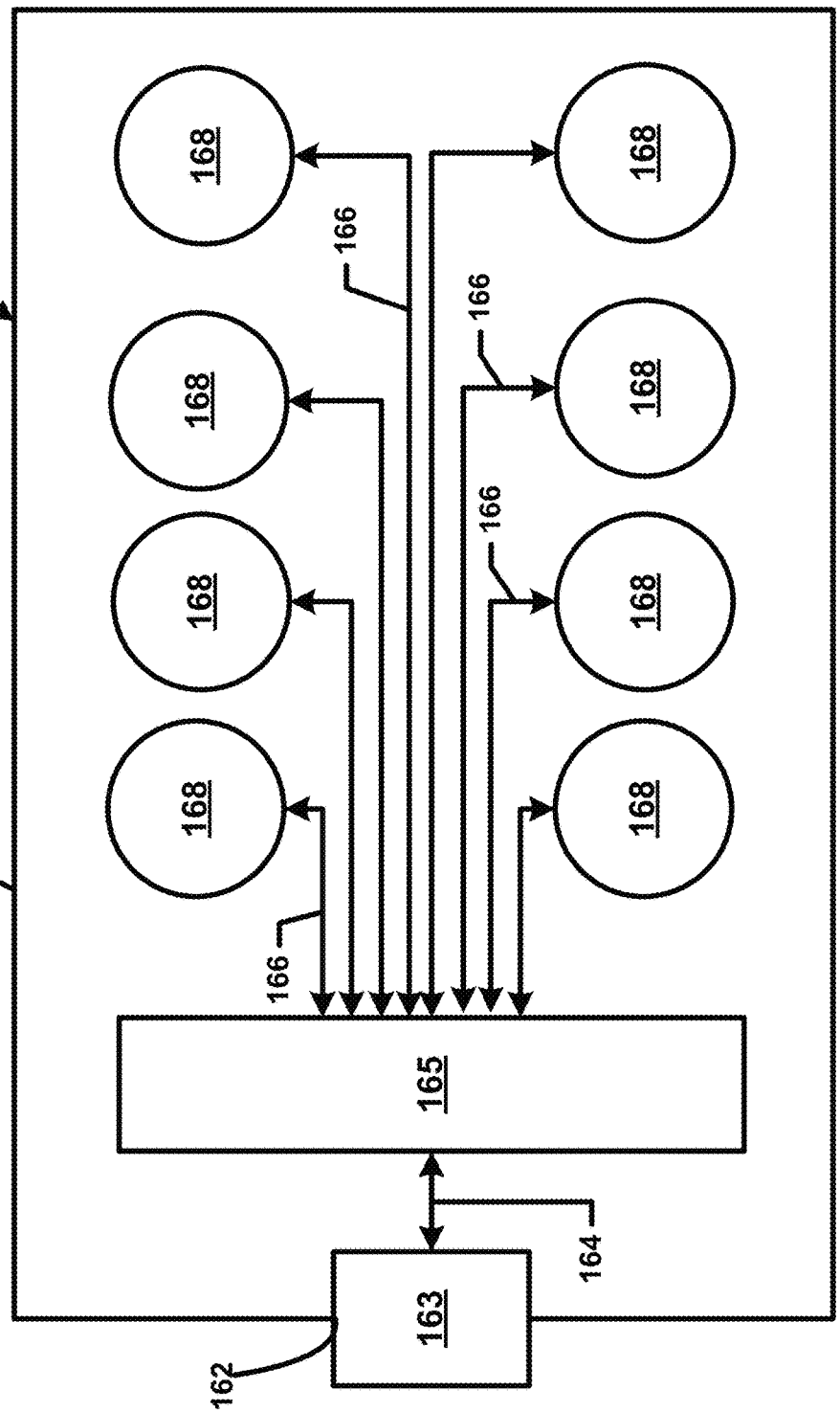
FIG. 3 is a schematic block diagram of a first example type of distribution terminal suitable for use in the passive optical network of FIG. 1.

FIG. 3 is a schematic block diagram of a first example type of distribution terminal 132 suitable for use in the passive optical network 100 of FIG. 1. The distribution terminal 132 includes a body 161 defining an input port 162 and at least two output ports 168. The drop fiber 156 is received at the input port 162. In the example shown, the feeder terminal body 161 defines eight output ports 168. In other implementations, however, the distribution terminal body 161 may define greater or fewer (e.g., three, four, six, ten, twelve, etc.) output ports 168. The distribution terminal body 161 houses a splitter arrangement 165 that is configured to split optical signals carried over the drop fiber 156 to the output ports 168 (see lines 166). In the example shown, the splitter arrangement 165 includes a 1 by 8 power splitter.

In some implementations, an optical connector interface 163 is disposed at the input port 162 of the distribution terminal body 161 to enable a "plug and play" type connection. In certain implementations, the optical connector interface 163 is ruggedized (i.e., hardened) to seal the interior of the feeder terminal body 161 from contaminants. In some implementations, the optical connector interface 163 includes an optical connector from which a splitter input fiber 164 routes to the splitter arrangement 165. In other implementations, the optical connector interface 163 includes an optical socket from which a splitter input fiber 164 routes to the splitter arrangement 165. In still other implementations, the optical connector interface 163 includes an optical adapter configured to interface two optical connectors. Some non-limiting example ruggedized optical connector interfaces suitable for use with a distribution terminal 130 are disclosed in U.S. Pat. Nos. 7,744,288, 7,762,726, 7,744,286, 7,942,590, and 7,959,361, incorporated by reference above.

Figure 4:
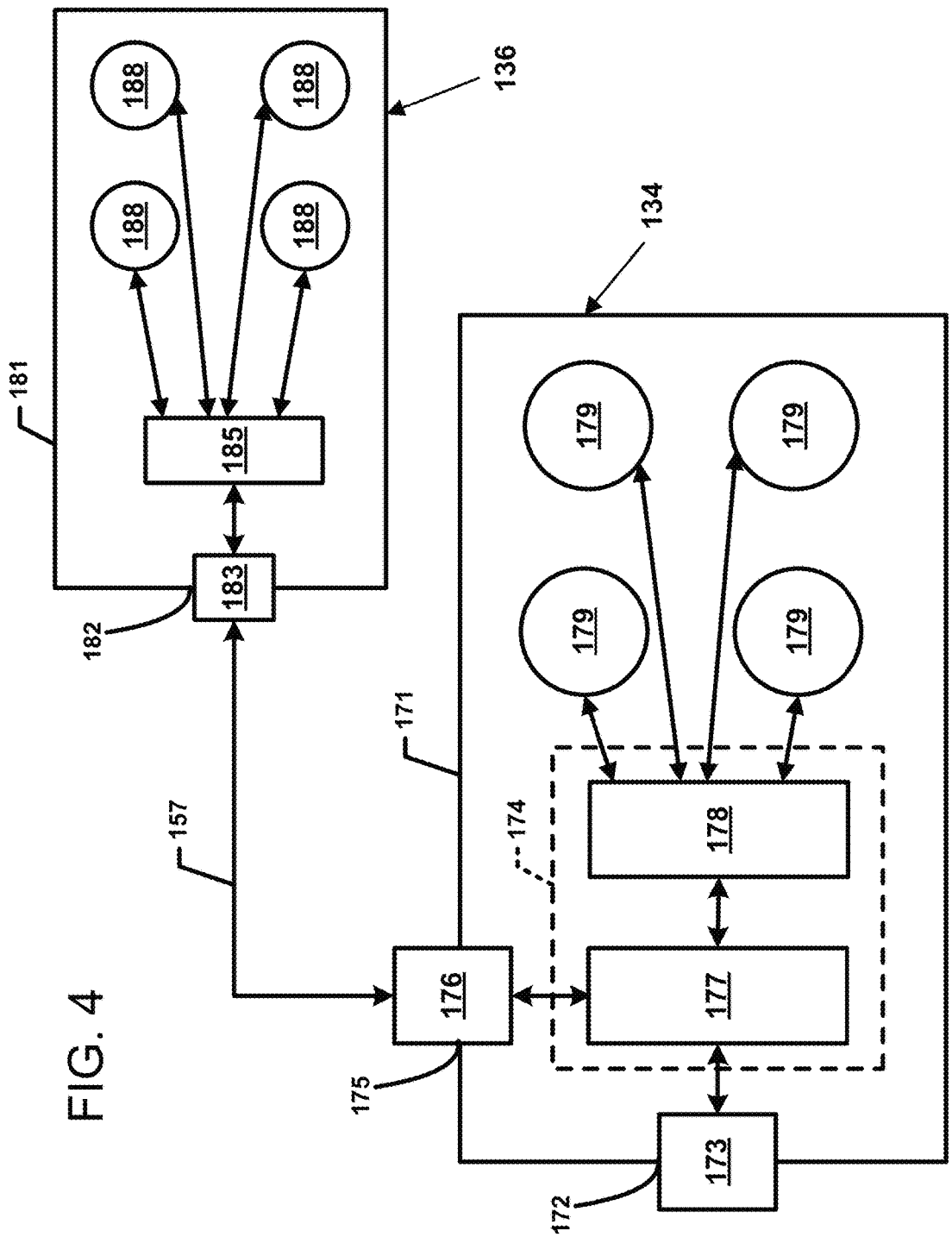
FIG. 4 is a schematic block diagram of an example cascading type of distribution terminal suitable for use in the passive optical network of FIG. 1.

FIG. 4 is a schematic block diagram of an example cascading type of distribution terminal 135 suitable for use in the passive optical network 100 of FIG. 1. The example cascading distribution terminal 135 includes an example second type of distribution terminal 134 and an example third type of distribution terminal 136. The second distribution terminal 134 includes a body 171 defining an input port 172 and at least two output ports 179. The drop fiber 156 is received at the input port 172. In the example shown, the body 171 defines four output ports 179. In other implementations, however, the body 171 may define greater or fewer (e.g., three, five, eight, etc.) output ports 179. In certain implementations, the body 171 also defines a pass-through port 175.

The second type of distribution terminal 134 also includes a splitter arrangement 174 that is configured to split optical signals carried over the drop fiber 156 to the output ports 179. In some implementations, the splitter arrangement 174 includes at least a first optical power splitter 177 and a second optical power splitter 178. The first optical power splitter 177 splits signals carried by the drop fiber 156 and directs a first split signal to the second optical power splitter 178 and a second split signal to the pass-through port 175. In the example shown, the first optical power splitter 177 is a 1 by 2 splitter, which splits the power of the optical signals 50/50. In other implementations, the first optical power splitter 177 may split the signals unevenly (e.g., 25/75). The second optical power splitter 178 receives the first split signal from the first optical power splitter 177 and splits that signal into four signals, which are directed to the output ports 179. In the example shown, the second optical power splitter 178 is a 1 by 4 splitter.

In some implementations, an optical connector interface 173 is disposed at the input port 172 of the distribution terminal body 171 to enable a "plug and play" type connection. Indeed, in some implementations, a second optical connector interface 176 is disposed at the pass-through port 173 of the distribution terminal body 171 to enable a "plug and play" type connection. In other implementations, optical fiber (e.g., pigtail fibers, stub fibers, spliced fibers, etc.) may be routed through the ports 172, 175 to the splitter. In certain implementations, the optical connector interfaces 173, 176 are ruggedized (i.e., hardened) to seal the interior of the distribution terminal body 171 from contaminants. In various implementations, the optical connector interfaces 173, 176 include optical connectors, optical sockets, or optical adapter. Some non-limiting example ruggedized optical connector interfaces suitable for use with a distribution terminal 134 are disclosed in U.S. Pat. Nos. 7,744,288, 7,762,726, 7,744,286, 7,942,590, and 7,959,361, incorporated by reference above.

The third type of distribution terminal 136 includes a body 181 defining an input port 182 and at least two output ports 188. The cascade fiber 157 is received at the input port 182. In the example shown, the distribution terminal body 181 defines four output ports 188. In other implementations, however, the distribution terminal body 181 may define greater or fewer (e.g., three, six, ten, twelve, etc.) output ports 188. The distribution terminal body 181 houses a splitter arrangement 185 that is configured to split optical signals carried over the cascade fiber 157 to the output ports 188. In the example shown, the splitter arrangement 185 includes a 1 by 4 power splitter.

In some implementations, an optical connector interface 183 is disposed at the input port 182 of the distribution terminal body 181 to enable a "plug and play" type connection. In certain implementations, the optical connector interface 183 is ruggedized (i.e., hardened) to seal the interior of the feeder terminal body 181 from contaminants. In various implementations, the optical connector interface 183 includes an optical connector, an optical socket, or an optical adapter. For example, in some implementations, the cascade fiber 157 is connectorized at both ends. A first end of the cascade fiber 157 plugs into a ruggedized socket or adapter at the pass-through port 175 of the first body 171 and a second end plugs into a ruggedized socket or adapter at the input port 182 of the second body 181. Some non-limiting example ruggedized optical connector interfaces suitable for use with a distribution terminal 136 are disclosed in U.S. Pat. Nos. 7,744,288, 7,762,726, 7,744,286, 7,942,590, and 7,959,361, incorporated by reference above.

Figure 5:
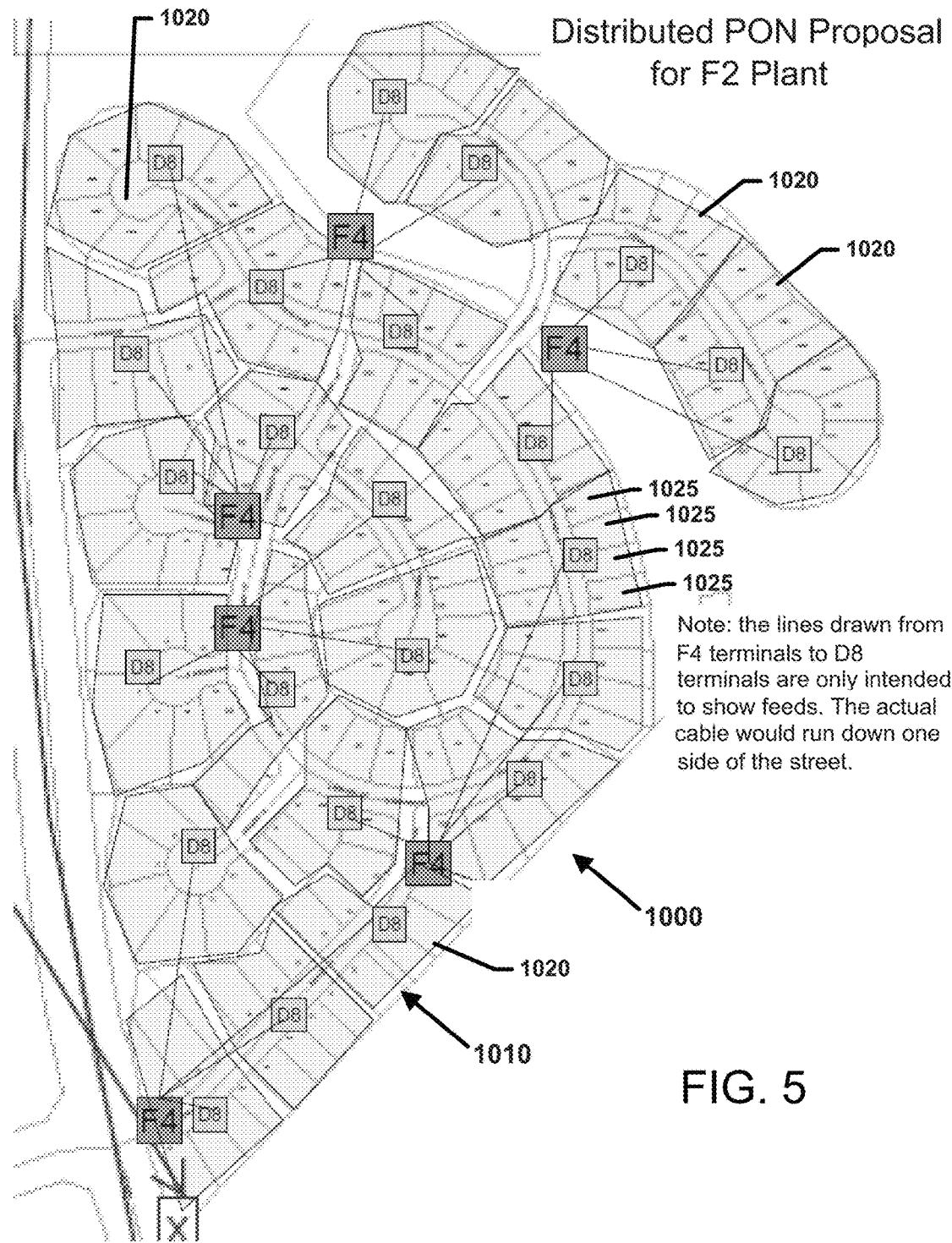
FIG. 5 is a network map showing the deployment of an example distributed passive optical network over an example neighborhood in accordance with the principles of the disclosure.

FIG. 5 is a network map showing the deployment of an example distributed passive optical network 1000 over an example neighborhood 1010. For ease in viewing, only the feeder terminals 120 (labeled "F4") and distribution terminals 130 (labeled "D8") are shown. In use, however, each of the feeder terminals 120 would receive a feeder cable fiber 154 from a network hub or pedestal 110. In the example shown, each feeder terminal 120 includes a 1 by 4 splitter and each distribution terminal 130 includes a 1 by 8 splitter. Each distribution terminal 130 provides service to a section 1020 of the neighborhood 1010. For example, each section 1020 includes two or more structures (e.g., homes, offices, etc.) 1025 to which a subscriber fiber 158 is routed.

The feeder terminals 120 are disposed at various locations in the neighborhood 1010. Some types of feeder terminals 120 may be disposed within pedestals or cabinets. Other types of feeder terminals 120 may be disposed within handholes. Still other types of feeder terminals 120 may be disposed within wall boxes. Each drop fiber 156 is routed from one of the feeder terminals 120, along one or more streets within the neighborhood 1010, to a respective distribution terminal 130.

Each distribution terminal 130 is disposed within one of the neighborhood sections 1020. Some types of distribution terminals 130 may be disposed in a pedestal or cabinet. Certain types of distribution terminals 130 may be disposed within a pedestal or cabinet with a corresponding feeder terminal 120. Other types of distribution terminals 130 may be disposed within handholes. Still other types of distribution terminals 130 may be disposed within wall boxes. Each subscriber fiber 158 is routed from one of the distribution terminals 130, along one or more streets within the neighborhood section 1020, to a respective subscriber location 140.

Figure 6:
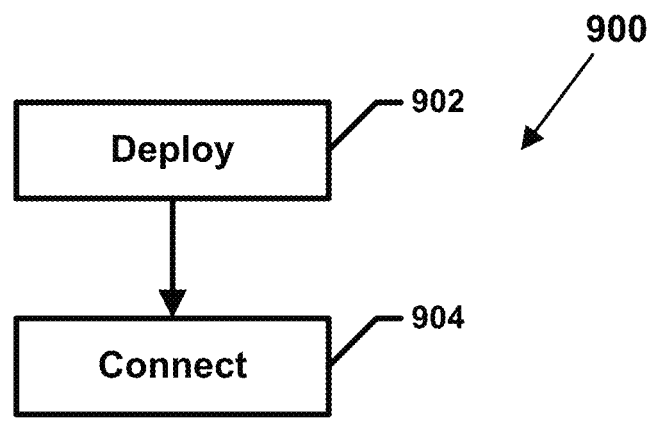
FIG. 6 is a flow diagram illustrating a method of providing a distributed passive optical network in a neighborhood.

FIG. 6 is a flow diagram 900 illustrating a method of providing a distributed passive optical network, such as network 100 of FIG. 1 or network 1000 of FIG. 5, in a neighborhood. The method diagram 900 includes a deploy operation 902 during which a network framework is installed in the neighborhood. For example, the network framework may include pedestals, handholes, conduits, and other such components. The method diagram 900 also includes a connect operation 904 during which optical connections are made between the central office and the subscribers 140.

In some implementations, the connect operation 904 is implemented at a subsequent date to the deploy operations 902. For example, the framework for the network (e.g., the conduits, pedestals, handholes, and optical fibers) may be laid at an initial date and the terminals 120, 130 may be added at a subsequent date when service is required. Indeed, in certain implementations, the terminals 120, 130 may be added incrementally as service is required. For example, a feeder terminal 120 and distribution terminals 130 may be added for one section 1020 of a neighborhood on a first date and a second feeder terminal 120 and corresponding distribution terminals 130 may be added at a later date. In other implementations, some or all of the terminals 120, 130 may be installed when the framework is laid.

In some implementations, the deployment operation 902 includes installing handholes and/or pedestals at appropriate feeder locations and distribution locations. Conduits are laid between the feeder and distribution locations. In some implementations, the conduits are installed in small bores through the street. In certain implementations, the conduits include ducts having a diameter of about one inch. In other implementations, the conduits may have a larger or smaller diameter. Optical fibers may be routed along the conduits between the feeder locations and the distribution locations. In some implementations, a single optical fiber is routed through each conduit. Ends of the optical fibers may be stored at the respective handholes and/or pedestals.

One or more feeder terminals 120 and two or more distribution terminals 130 are deployed during the connect operation 904. The optical fibers are connected to the terminals 120, 130 during a connect operation 908. For example, in one implementation, a connectorized end of an optical fiber may be plugged into a socket defined by one of the terminals 120, 130. In another implementation, the optical fiber may define a combination connector and adapter that is configured to connect to a connector disposed at the terminal 120, 130.

Figure 7:
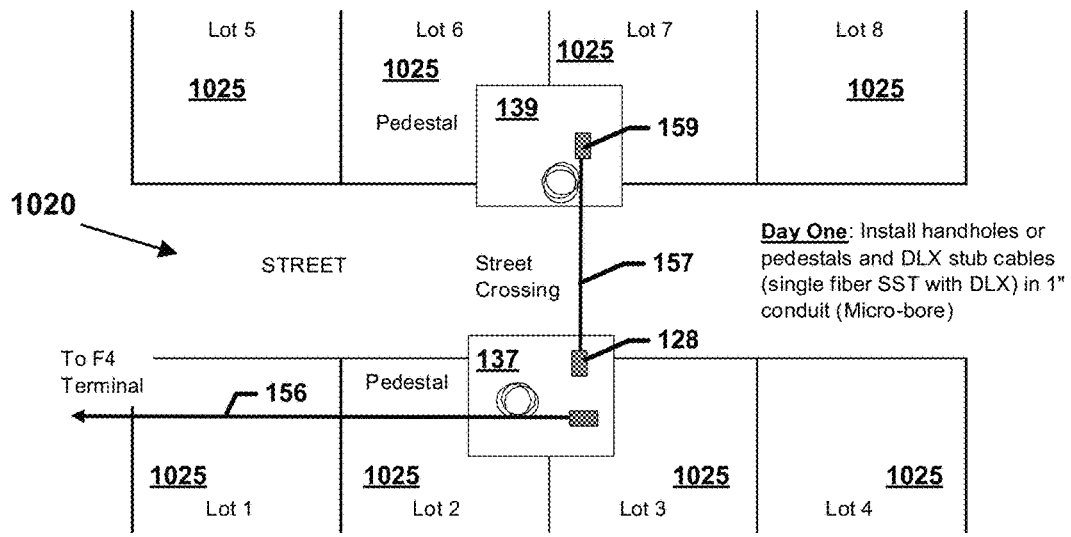
FIGS. 7 and 8 are schematic diagrams showing the deployment of a cascading-type distribution terminal at one example section of a neighborhood.
Figure 8:
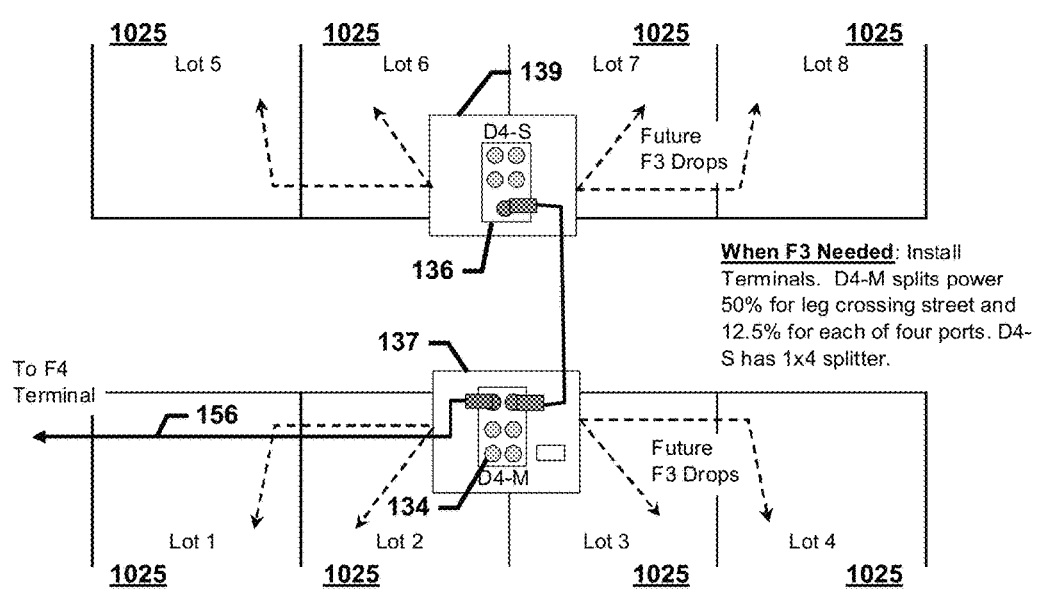

FIGS. 7 and 8 are schematic diagrams showing the deployment of a cascading-type distribution terminal 135 at one example section 1020 of a neighborhood. The neighborhood section 1020 includes a street lined with four lots 1025 on each side. FIG. 7 shows the deployment of the network framework including a first pedestal or handhole 137 at a first side of the street and a second pedestal or handhole 139 at a second side of the street. A first conduit is installed along the first side of the street (e.g., underground) to provide a pathway to the first pedestal or handhole 137. A second conduit is installed across the street (e.g., underground) to connect the first pedestal 137 to the second pedestal 139.

A drop fiber 156 is routed along the first side of the street through the first conduit to the first pedestal or handhole 137. In some implementations, excess length of the drop fiber 156 is stored in the pedestal or handhole 137. In certain implementations, the drop fiber 156 has a connectorized end that is stored in the pedestal or handhole 137. In other implementations the drop fiber 156 is terminated at a distribution terminal (e.g., distribution terminal 134) that is disposed in the pedestal or handhole 137.

A cascade fiber 157 is routed through the second conduit to the second pedestal or handhole 139. In some implementations, excess length of the cascade fiber 157 is stored in the second pedestal or handhole 137. In certain implementations, the cascade fiber 157 has a first connectorized end 158 that is stored in the first pedestal or handhole 137 and a second connectorized end 159 that is stored in the second pedestal or handhole 139. In other implementations, the second end of the cascade fiber 157 may be terminated at a distribution terminal (e.g., distribution terminal 136) that is disposed in the second pedestal or handhole 139.

When service to one or more lots 1025 in the neighborhood section 1020 is desired, one or more terminals 120, 130 may be installed. For example, as shown in FIG. 8, one example distribution terminal 134 may be disposed in the first pedestal or handhole 137 and another example distribution terminal 136 may be disposed in the second pedestal or handhole 139. A connectorized end of the drop cable 156 is plugged into the input (e.g., connector interface 173) of the distribution terminal 134 disposed in the first pedestal or handhole 137. The first connectorized end 158 of the cascade fiber 157 is plugged into a connector interface 176 at the pass-through port 176 of the distribution terminal 134. The second connectorized end 158 of the cascade fiber 157 is plugged into the input (e.g., connector interface 183) of the distribution terminal 136 disposed in the second pedestal or handhole 139.

In one such implementation, the signal power received at the distribution terminal 134 is split so that 50% of the power is routed through the cascade fiber 157 to the distribution terminal 136. The remaining signal power is split evenly at the distribution terminal 134 so that about 12.5% of the initial signal power is provided to each output port 179 of the distribution terminal 134. The distribution terminal 136 splits the received signal power evenly so that about 12.5% of the initial signal power is provided to each output port 188 of the distribution terminal 136.

Figure 9:
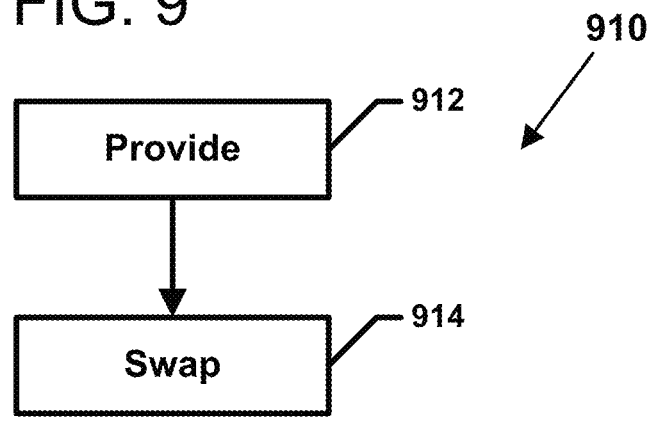
FIG. 9 is a flow diagram illustrating a method of upgrading a distributed passive optical network in accordance with the principles of the disclosure.

FIG. 9 is a flow diagram 910 illustrating a method of upgrading a distributed passive optical network, such as network 100 of FIG. 1 or network 1000 of FIG. 5. The method diagram 910 includes a provide operation 912 at which a distributed passive optical network is deployed or acquired. The distributed passive optical network includes optical power splitters disposed at one or more of the feeder terminals 120 and/or distribution terminals 130.

A swap operation 914 replaces one or more of the optical power splitters with wave division multiplexers. For example, in some implementations, the network may be upgraded by replacing the optical power splitters located within the feeder terminals 120 with wave division multiplexers. In certain implementations, the entire feeder terminal 120 may be replaced with an upgraded terminal housing the wave division multiplexers. In other implementations, the network may be upgraded by replacing the optical power splitters located within the distribution terminals 130 with wave division multiplexers. In certain implementations, the entire distribution terminal 130 may be replaced with an upgraded terminal housing the wave division multiplexers.

In some implementations, the upgraded terminals (e.g., upgraded feeder terminals 120 and/or upgraded distribution terminals 130) may include plug and play type connections. For example, an upgraded terminal may include a ruggedized connector, socket, or adapter at which a connectorized end of an optical fiber may be connected.

The invention claimed is:

1. A cascading distribution terminal arrangement comprising:
   a first distribution terminal defining an interior, the first distribution terminal including an optical splitter arrangement disposed within the interior, the optical splitter arrangement including a 1-by-2 optical power splitter and a second optical power splitter having a higher split ratio than the 1-by-2 optical power splitter, a first output line of the 1-by-2 optical power splitter being routed to a first single-fiber ruggedized output port to be accessible from an exterior of the fiber distribution terminal, a second output line of the 1-by-2 optical power splitter being routed to the second optical power splitter, optical signals split by the second optical power splitter being routed to a plurality of single-fiber ruggedized output ports that are separate from the first single-fiber ruggedized output port, the single-fiber ruggedized output ports being accessible from an exterior of the fiber distribution terminal;
   a second distribution terminal defining a ruggedized input port and a plurality of ruggedized output ports that are accessible from an exterior of the second distribution terminal; and
   a cascade fiber routed between the first single-fiber ruggedized output port of the first distribution terminal and the ruggedized input port of the second distribution terminal.

2. The cascading distribution terminal arrangement of claim 1, further comprising a plurality of subscriber fibers, each subscriber fiber being routed from one of the first and second distribution terminals to a respective subscriber location.

3. The cascading distribution terminal arrangement of claim 1, wherein the second distribution terminal includes an optical power splitter having a same split ratio as the second optical power splitter.

4. A method of providing a distributed passive optical network comprising:
   deploying a network framework at feeder locations and distribution locations within a geographical area on a first day, wherein deploying the network framework includes laying conduit between the feeder and distribution locations, routing optical fibers along the conduits between the feeder locations and the distribution locations, and storing ends of the optical fibers at respective handholes and/or pedestals, the ends being connectorized; and
   subsequently incrementally installing distribution terminals on a second day that is after the first day, wherein installing the distribution terminals on a second day that is after optical fibers to the distribution terminals.

5. The method of claim 4, wherein connecting the ends of the optical fibers to the distribution terminals comprises plugging the connectorized ends of the optical fibers into ruggedized adapters of the distribution terminals.

6. The method of claim 4, wherein the conduits are laid in small bores through streets.

7. The method of claim 4, further comprising routing a drop fiber through one of the conduits to one of the pedestals and/or handholes.

8. The method of claim 7, wherein excess length of the drop fiber is stored in the pedestal and/or handhole.

9. The method of claim 7, wherein a connectorized end of the drop fiber is initially stored in the pedestal and/or handhole during deployment of the network framework and is subsequently plugged into a respective one of the distribution terminals during installation of the distribution terminal.

10. The method of claim 4, wherein subsequently incrementally installing distribution terminals comprises installing a drop terminal having a plurality of ports, wherein a first of the ports of the drop terminal receives optical signals having a first split ratio and wherein others of the ports of the drop terminal receive optical signals having a second split ratio that is higher than the first split ratio.

11. The method of claim 10, wherein the first port of the drop terminal is a single-fiber port.

12. The method of claim 10, further comprising an optical line routed from the first port to a handhole.

13. The method of claim 12, wherein the optical line is routed beneath a street.

14. The method of claim 12, further comprising subsequently installing a second terminal holding an optical splitter and coupling the optical line to an input of the optical splitter.

15. The method of claim 10, further comprising subsequently upgrading the distributed passive optical network by replacing the drop terminal with a wave division multiplexer terminal.

16. A cascading distribution system comprising:
a feeder terminal housing a splitter arrangement in which a distribution fiber is split into at least two drop fibers;
a first distribution terminal having a ruggedized input port, a plurality of ruggedized output ports, and an optical power splitter arrangement, the ruggedized input port receiving a first of the at least two drop fibers from the feeder terminal, the optical splitter arrangement including a 1-by-2 optical power splitter and a second optical power splitter having a higher split ratio than the 1-by-2 optical power splitter, a first output line of the 1-by-2 optical power splitter being routed to a first single-fiber ruggedized output port to be accessible from an exterior of the first distribution terminal, a second output line of the 1-by-2 optical power splitter being routed to the second optical power splitter, optical signals split by the second optical power splitter being routed to a plurality of single-fiber ruggedized output ports that are separate from the first single-fiber ruggedized output port, the single-fiber ruggedized output ports being accessible from an exterior of the first distribution terminal;
a second distribution terminal having a ruggedized input port, a plurality of ruggedized output ports, and a third optical power splitter, the ruggedized input port receiving signals from the first single-fiber ruggedized output port of the first distribution terminal, the third optical power splitter having a common split ratio with the second optical power splitter of the first distribution terminal; and
a third distribution terminal having a ruggedized input port, a plurality of ruggedized output ports, and a fourth optical power splitter, the ruggedized input port receiving a second of the at least two drop fibers from the feeder terminal, the fourth optical power splitter splitting optical signals carried over the second drop fiber to the ruggedized output ports at a split ratio that is double the common split ratio of the second and third optical power splitters.

* * * * *

UNITED STATES PATENT AND TRADEMARK OFFICE
CERTIFICATE OF CORRECTION

PATENT NO. : 9,739,945 B2
APPLICATION NO. : 14/491049
DATED : August 22, 2017
INVENTOR(S) : Dowling Page 1 of 1

It is certified that error appears in the above-identified patent and that said Letters Patent is hereby corrected as shown below:

In the Claims

Column 8, Lines 64-67, Claim 4: "subsequently incrementally installing distribution terminals on a second day that is after the first day, wherein installing the distribution terminals on a second day that is after optical fibers to the distribution terminals." should read --subsequently incrementally installing distribution terminals on a second day that is after the first day, wherein installing the distribution terminals includes connecting the ends of the optical fibers to the distribution terminals.--

Signed and Sealed this
Seventh Day of May, 2019

Andrei Iancu
*Director of the United States Patent and Trademark Office*